United States Patent
Ichikawa et al.

Patent Number: 5,191,387
Date of Patent: Mar. 2, 1993

[54] POLARIZATION CONTROL SYSTEM

[75] Inventors: Akio Ichikawa; Toshiyuki Takeda; Satoshi Matsuura, all of Tokyo, Japan

[73] Assignee: Ando Electric Co., Ltd., Tokyo, Japan

[21] Appl. No.: 637,096

[22] Filed: Jan. 3, 1991

[30] Foreign Application Priority Data

Jan. 10, 1990 [JP] Japan ......................................... 2-3230
Jan. 10, 1990 [JP] Japan ......................................... 2-3231

[51] Int. Cl.$^5$ .............................. G01B 11/18; G01J 4/00
[52] U.S. Cl. .................................... 356/34; 356/364; 356/368; 385/1
[58] Field of Search ............................... 356/32-35.5, 356/365, 366, 367, 368, 369; 73/800; 250/225; 350/96.15, 96.29; 359/483-501, 246, 249, 250, 251; 385/1, 2, 11, 43, 28

[56] References Cited

U.S. PATENT DOCUMENTS

| | | | |
|---|---|---|---|
| 2,976,764 | 3/1961 | Hyde et al. | 359/501 |
| 3,520,617 | 7/1970 | Webb | 356/365 |
| 3,645,603 | 2/1972 | Smith | 350/96.29 |
| 5,004,312 | 4/1991 | Shimizu | 385/1 |
| 5,052,786 | 10/1991 | Schulz | 359/484 |

Primary Examiner—Richard A. Rosenberger
Assistant Examiner—Hoa Q. Pham
Attorney, Agent, or Firm—Seidel, Gonda, Lavorgna & Monaco

[57] ABSTRACT

A polarization is controlled by introducing a phase difference in an incident light at first, then introducing a phase difference by 45 degrees, and then the polarized light is rotated. The light is passed through an analyzer so arranged that the direction of the transmission axis of the analyzer does not coincide with the principal axes of the means for introducing the phase differences, thereby to convert the polarized condition into a light volume which is used to control the phase differences and the rotation.

2 Claims, 12 Drawing Sheets

POLARIZATION CONTROL SYSTEM

TECHNICAL FIELD OF THE INVENTION

The present invention relates to a light polarization control system for converting an incident light having an unknown polarized condition into a polarized light having a known polarized condition.

The present invention also relates to a light polarization measuring system using a similar system obtaining a phase difference between two components of a light in a Cartesian axis system and deriving the degree of polarization, the directional angle of principal polarization axis and the direction of rotation of the polarized light from the phase difference.

BACKGROUND OF THE INVENTION

The conventional control system for controlling polarization of a light will be explained briefly by making reference to FIG. 2.

Figure 2:
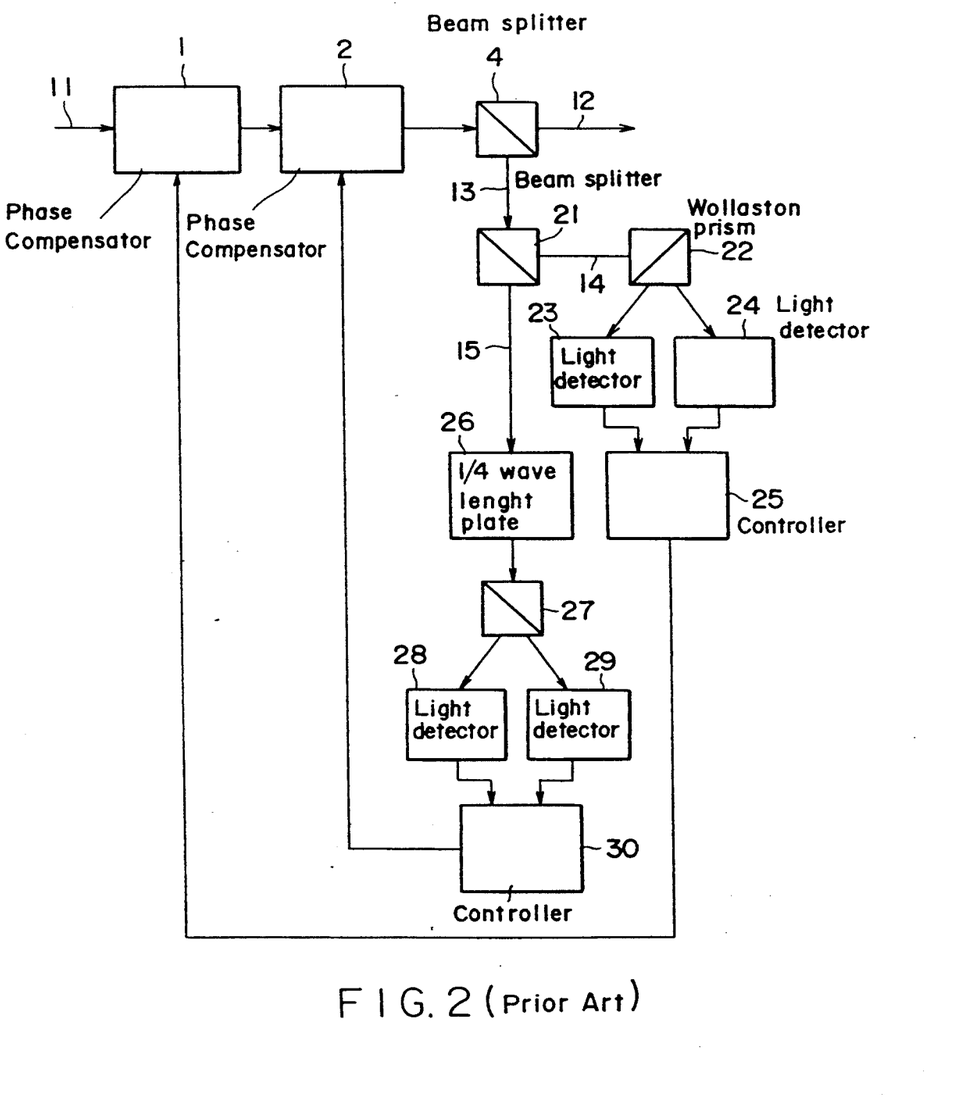
FIG. 2 shows the conventional polarization control system.

In FIG. 2, 1 and 2 are phase compensators, 4 is a beam splitter, 22 is a Wollaston prism, 23 and 24 are light detectors, 25 is a controller, 26 is a ¼ wavelength plate, 27 is a Wollaston prism, 28 and 29 are light detectors and 30 is a controller.

An incident light 11 is passed through the phase compensators 1 and 2 and then divided into an exit light 12 and a monitor light 13 by means of a beam splitter 4.

The phase compensators 1 and 2 may utilize a birefringence which is changed by an electric field applied to an electro-optical crystal or by a stress applied to a glass.

The monitor light 13 is split into monitor lights 14 and 15.

The monitor light 14 is further divided into mutually perpendicular polarized light components by the Wollaston prism 22 and the difference in power of these components is detected by the light detectors 23 and 24 and the controller 25. The detected power difference controls the phase compensator 1.

The monitor light 15 is passed through the ¼ wavelength plate 26 and divided into mutually perpendicular polarized components and the difference in power of these components is detected by the light detectors 28 and 29 and the controller 30. The detected power difference controls the phase compensator 2.

The directions of the principal axes of the phase compensators 1 and 2 are mutually inclined by an angle of 45 degrees.

The directions of the principal axes of the Wollaston prisms 22 and 27 are mutually inclined by an angle of 45 degrees and the principal axis of the Wollaston prism 22 is in coincidence with that of the ¼ wavelength plate 26.

The outputs of the light detectors 23 and 24 are led to the controller 25 which, in turn, controls the phase compensator 1 so as to make the output difference, that is, the difference between the perpendicular components of the monitor light 14, zero.

By so doing, the direction of the polarization principal axis is caused to coincide with the principal axis of the Wollaston prism 27.

The outputs of the light detectors 28 and 29 enter the controller 30 which, in turn, controls the phase compensator 2 in such manner that the difference between the outputs becomes zero.

Thus, the incident light 11 is adjusted to obtain a linearly polarized light.

The polarization of the output light in the conventional technique illustrated in FIG. 2 is restricted to linearly polarized lights because the respective output differences of the perpendicularly polarized light components are so controlled that they become zeros.

In addition, even if the detection system is replaced with other systems, it is not possible to continuously change the polarized condition since the two phase compensators can merely control the phase difference of perpendicularly polarized components of an incident light.

Accordingly, an object of the present invention is to provide a polarization control system capable of continuously controlling the polarized condition of a light.

Figure 12:
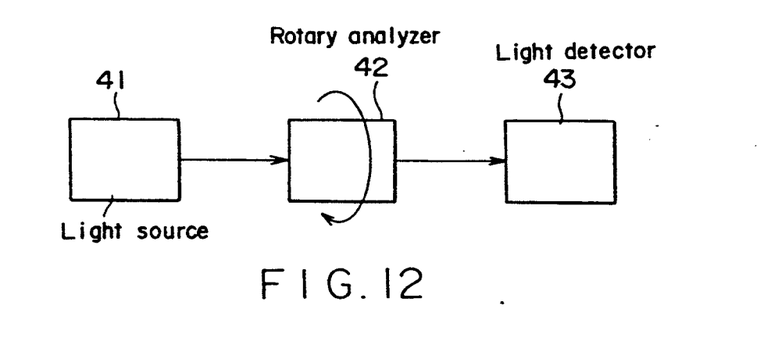
FIG. 12 shows the conventional measurement system.

Measurement of polarization according to the conventional system is shown in FIG. 12 which includes a light source 41, a rotary analyzer 42 and a light detector 43.

A light consisting of any polarized light exiting from the light source 41 goes through the rotary analyzer 42 to become a specific linearly polarized light, which in turn is detected by the light detector 43.

We assume that the output signal of the light detector 43 is $I_{MAX}$ when the output becomes the maximum with the rotation by the rotary analyzer 42. Also, when the rotary analyzer 42 is rotated by an angle of 90 degrees from the direction where the maximum output $I_{MAX}$ was obtained the minimum output $I_{MIN}$ is obtained. Then, the degree of polarization P is expressed by the following.

$$P = (I_{MAX} - I_{min})/(I_{MAX} + I_{MIN}) \quad (1)$$

When the light output from the light detector 43 becomes the maximum, the rotational angle of the rotary analyzer 42 is the directional angle of the principal polarization axis of the incident light.

In FIG. 12, the measurement is effected on the spacial distribution of light power and, accordingly, it is not possible to know the phase difference between the mutually perpendicular electrical field components. However, it is required to measure the phase difference in any event to know the rotational direction of the polarized light.

Further, the system shown in FIG. 12 necessitates a mechanical drive to rotate the rotary analyzer 42 and thus the accuracy of the measurement is greatly affected by the allowance of the mechanism, which should be eliminated for making the system smaller.

Although it is possible for the system shown in FIG. 12 to measure the degree of polarization and the directional angle of the principal polarization axis among the three parameters but is not possible to measure the angular direction of the rotation of the polarization.

Additional object of the invention is to provide a system to know all three parameters, that is, the degree of polarization and the directional angle of the principal polarization axis, as well as the angular direction of the rotation of the polarized light.

SUMMARY OF THE INVENTION

The present invention provides a polarization control system capable of continuously controlling the polarized condition of a light, which comprises, as means for controlling polarized condition a pair of phase compensators and one polarization rotor; as means for detecting the polarized condition an analyzer so arranged that the direction of the transmission axis of the analyzer does not coincide with the principal axes of the pair of the phase compensators; a light detector for receiving the light passed through the analyzer, whereby not only the polarized condition of an incident light can be arbitrarily converted into a linearly polarized light, circularly polarized light or elliptically polarized light, but also the directional angle of the principal axis of polarization is arbitrarily controlled and further the polarized condition can be continuously changed.

According to another object of the present invention, a measurement system utilizes a pair of external force applicators for applying external forces on a single mode optical fiber (hereinafter simply called "optical fiber") in radial directions. The Variation of the quantity of the light and the direction of the variation derived from an incident light passed through the location of the fiber where the external forces are applied is measured by a light detector and the forces applied to the optical fiber are measured by a force measuring device from voltages applied to the force applicators in the varying direction of the light received by the light detector. Then, the measured values are used to derive the phase difference which is used for calculating the degree of polarization and the directional angle of the principal polarization axis, as well as the angular direction of the rotation of the polarized light.

DETAILED DESCRIPTION OF THE INVENTION

Figure 1:
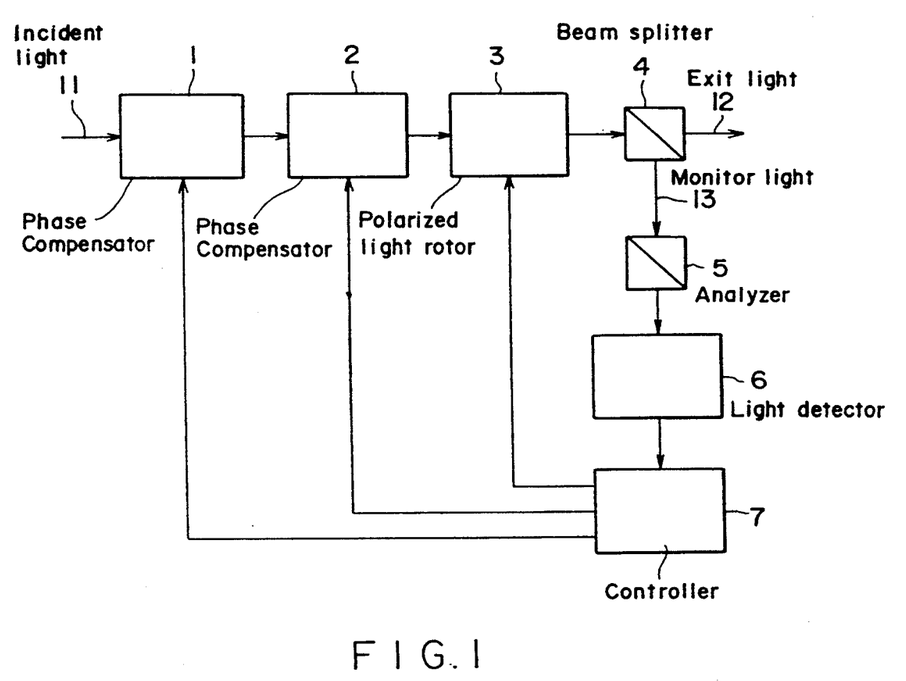
FIG. 1 illustrates a polarization control system according to the present invention.

Referring to FIG. 1 of the drawings, a polarization control system according to a preferred embodiment of the present invention comprises a first phase compensator 1 for introducing a phase difference with respect to an incident light 11. A second phase compensator 2 is provided for introducing a phase difference by 45 degrees with respect to the light passed through the first phase compensator 1. A polarized light rotor 3 is provided for rotating the plane of polarization of the light passed through the second phase compensator 2. There is further provided a beam splitter 4 for dividing the light passed through the rotor 3 into an exit light 12 and a monitor light 13. An analyzer 5 is provided and so arranged that the direction of the transmission axis of the analyzer does not coincide with any of the principal axes of the two phase compensators 1 and 2 for converting the polarized condition of the light formed by the first phase compensator 1, second phase compensator 2 and the polarization light rotor 3 into a light quantity. A light detector 6 is provided for detecting the motor light passed through the analyzer 5. Finally, the polarization control system is provided with a controller 7 for controlling the first and second phase compensators 1,2 and the polarized light rotor 3 in response to the output of the light detector 6.

Figure 3:
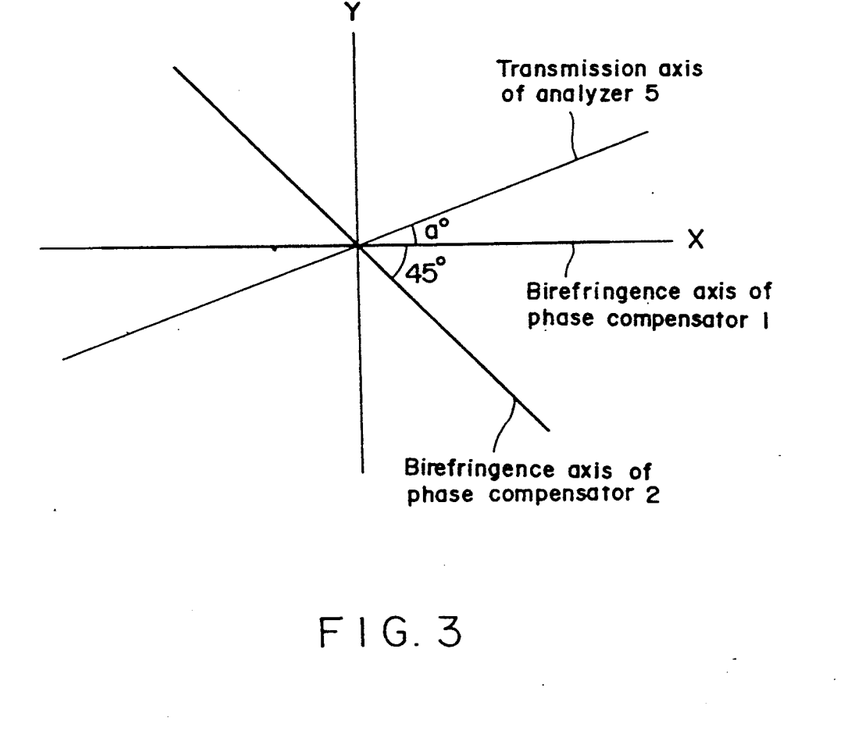
FIG. 3 is an explanatory view for explaining the mutual arrangement of the phase compensators 1 and 2 and the analyzer 5.

Mutual relationship of the phase compensators 1, 2 and the analyzer 5 is shown in FIG. 3.

In this figure, the direction of birefringence of the first phase compensator 1 is taken along the X axis and that of the second phase compensator 2 is taken along the an axis at an angle of −45 degrees with respect to the X axis and the transmission axis of the analyzer 5 is taken at an angle of α degrees.

Of course, the birefringence axis of the second phase compensator 2 may be at +45 degrees with respect to that of the first phase compensator.

Also, if the direction α of the transmission axis of the analyzer 5 is superposed on the birefringence axis of the first phase compensator 1 or of the second phase compensator 2, the quantity of light transmitted through the analyzer 5 will not vary even if the amount of the phase compensation of the phase compensator, whose birefringence axis is superposed on the transmission axis, is changed. Accordingly, it is required to keep the transmission axis direction α does not come into a superposing position on any of the birefringence axes of the phase compensators.

The polarization rotor 3 positioned at the downstream side of the phase compensators 1 and 2 may consist of a Faraday rotation element which is capable of freely rotating the direction angle of the principal polarization axis depending on the magnitude of a magnetic field and thus any incident polarized light can be continuously converted into any known polarized light.

Next, a process for converting the incident polarized light into any known polarized light will be described by making reference to FIGS. 4 and 5.

Figure 4:
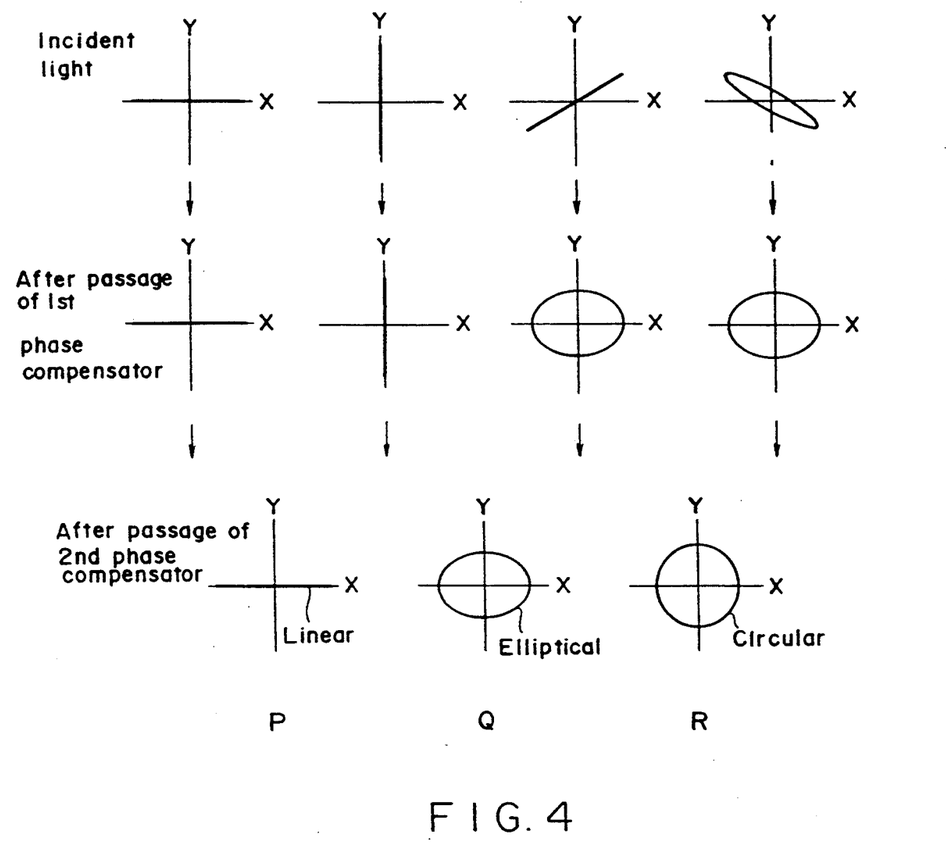
FIGS. 4 and 5 are explanatory views for explaining the process of continuously converting any incident light 11 into a polarized light having any known polarized condition.
Figure 5:
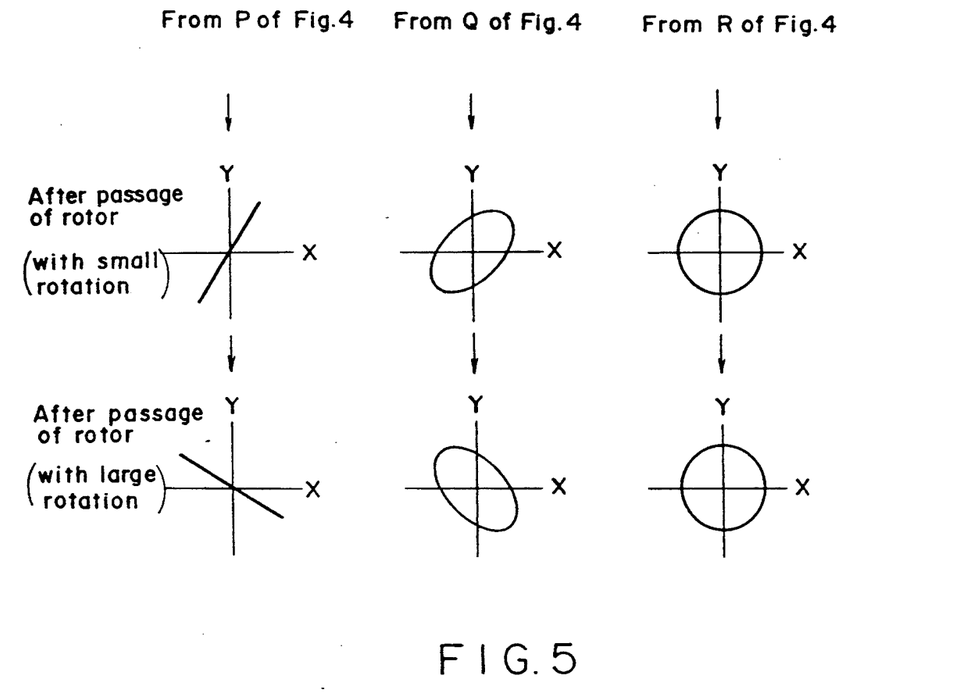

The symbols P, Q and R are to show that the bottom graphs in FIG. 4 continue to the top graphs of FIG. 5.

An incident light 11 having any given polarization is converted by the phase compensator 1 into a polarized light having a principal polarization axis on the X axis or the Y axis.

If the principal polarization axis of the incident light does not lie on the X axis or the Y axis, the phase compensator 1 adjusts the incident light in such manner that the incident light is modified and the principal polarization axis comes to lie on the X or Y axis.

The incident light thusly converted into one having its principal polarization axis lying on the X or Y axis is then converted into any polarized light having its principal polarization axis angle coming to lie on the X or Y axis.

Accordingly, the incident light is converted by the phase compensators 1 and 2 into any polarized light having its principal polarization axis on the X axis or Y axis, which is, in turn, converted by the polarization rotor 3 into a polarized light having any continuously varying principal polarization axis angle.

Also, while fixing the polarization rotation angle of the polarization rotor 3 at a given angle, the shape of the polarization may be adjusted by the phase compensator 2 to give a continuously varying shape of the polarized light.

Further, by simultaneously adjusting the polarization rotation angle of the polarization rotor 3 and the shape of the polarization, it is possible to obtain a polarized light having a continuously varying shape as well as a continuously varying principal polarization axis angle.

The operation of the phase compensators 1 and 2 and the polarization rotor 3 in FIG. 1 will be explained by making reference to FIGS. 6 to 10, in which it is assumed that the transmission axis direction of the analyzer 5 is 25 degrees.

Figure 6:
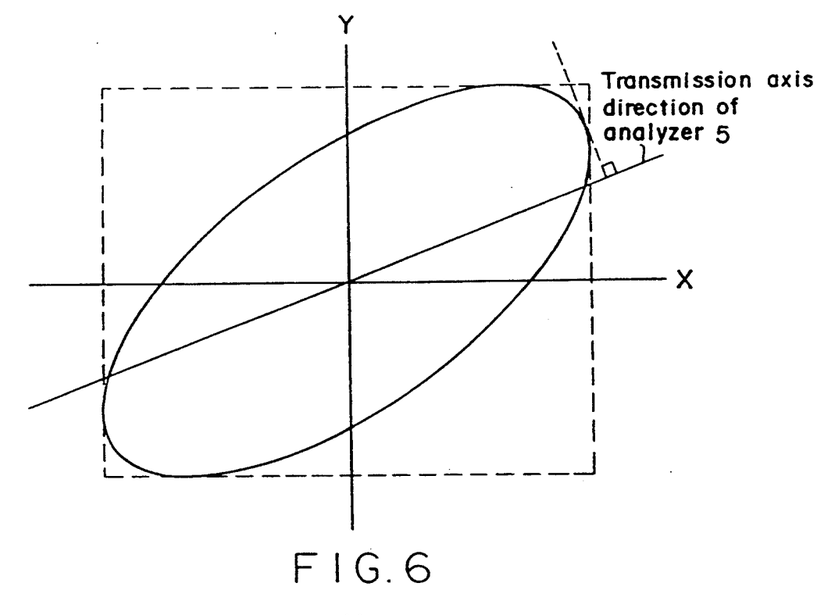
FIGS. 6, 7, 8, 9 and 10 are explanatory views on the operation of the first and second phase compensators and the polarization rotor shown in FIG. 1, with the transmission axis direction of the analyzer 5 at 25 degrees.

FIG. 6 shows an incident light 11 which is any elliptically polarized light.

Figure 7:
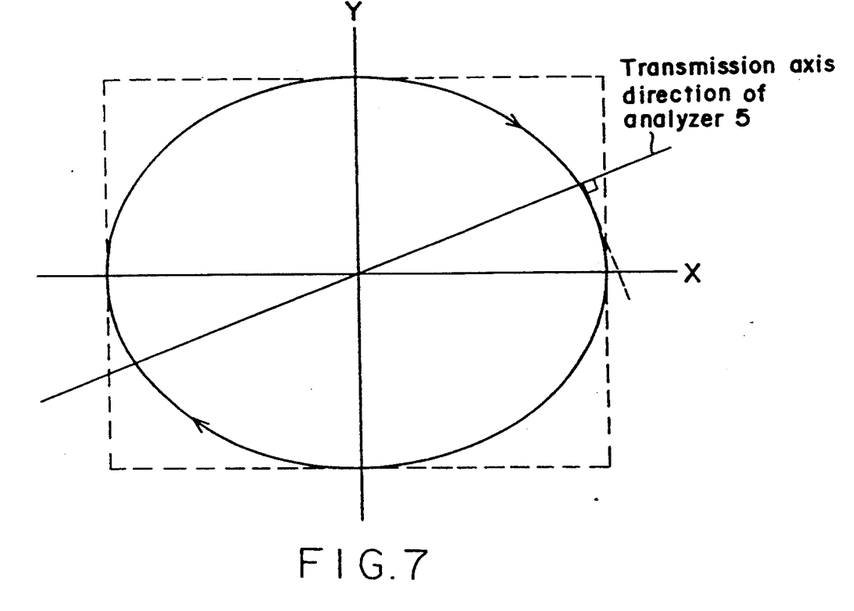

FIG. 7 shows a case where the incident light has been so adjusted that the principal polarization axis angle comes to lie on the X axis or Y axis by changing the phase difference of the incident light.

Figure 8:
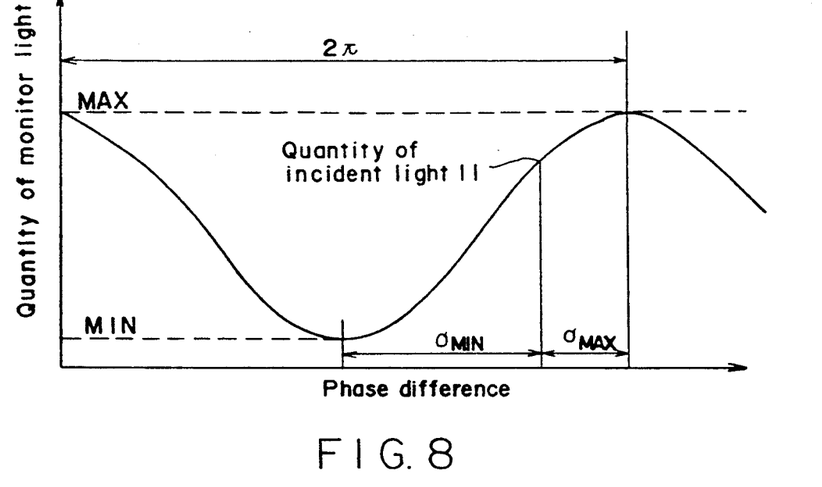

FIG. 8 shows a variation of the monitor light 13 passed through the analyzer 5 which is obtained during process of adjustment by the phase compensator 1.

In order to superpose the principal polarization axis of the incident light 11 on the X axis or the Y axis, the phase difference given by the phase compensator 2 is made zero, the rotation angle given by the polarization rotor 3 is made zero, and the quantity of the monitor light 13 received by the light detector 6 after passing through the analyzer 5 is used in the controller 7 to control by phase compensator 1 to give a phase difference $\delta_{MAX}$ which makes the light quantity maximum or to give a phase difference $\delta_{MIN}$ which makes the light quantity minimum.

Figure 9:
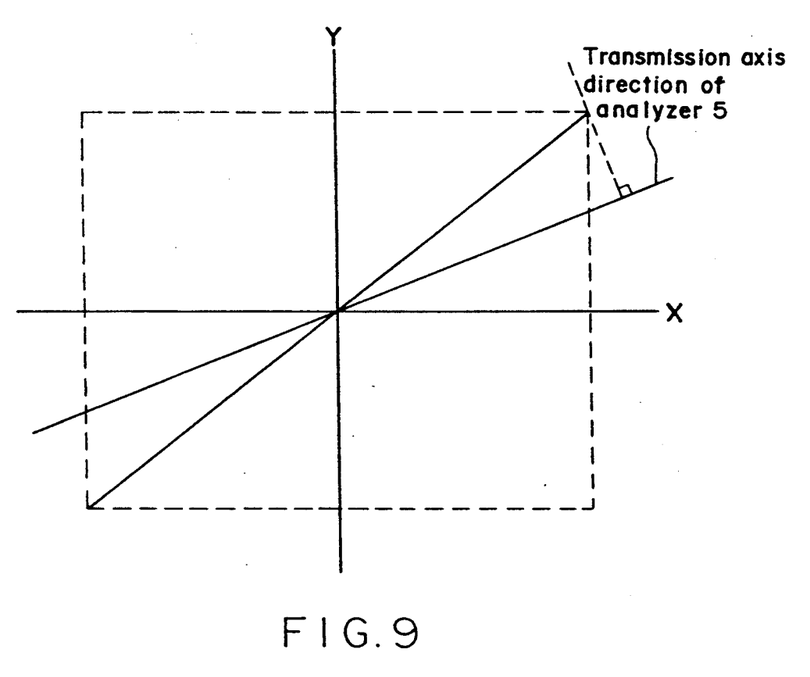
Figure 10:
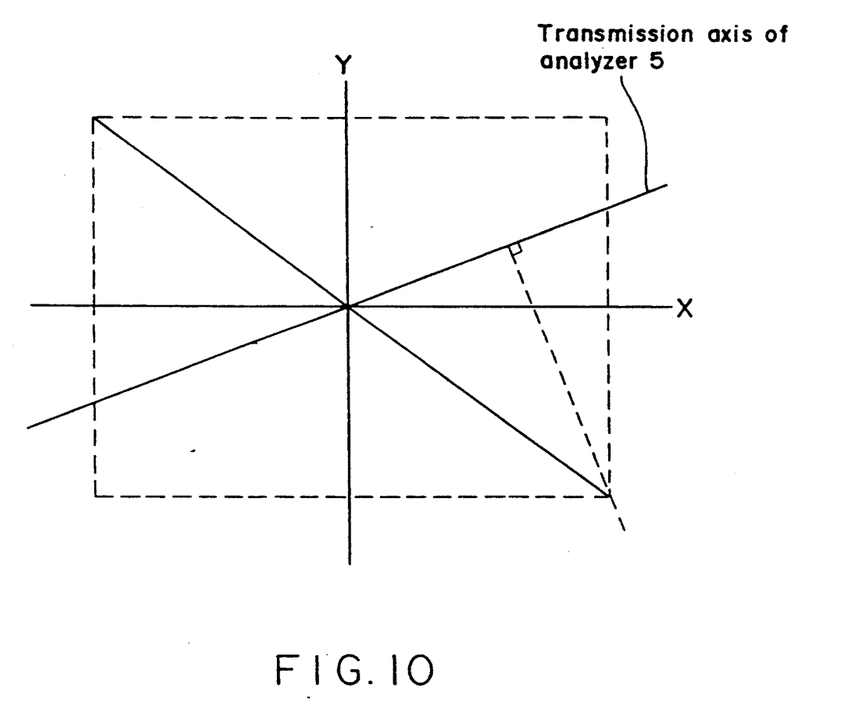

At this moment, the polarized condition of the incident light is converted into a linearly polarized light as shown in FIG. 9 when the light quantity received by the light detector 6 is the maximum, or a linearly polarized light as shown in FIG. 10 when the light quantity received by the light detector 6 is the minimum.

Next, when the quantity of the light received by the light detector 6 is the maximum, in other words, the polarization is linear as shown in FIG. 9, the phase difference given by the phase compensator 1 is made to be $(\delta_{MAX} - \pi/2)$.

On the other hand, when the quantity of the light received by the light detector 6 is the minimum, the phase difference given by the phase compensator 1 is made to be $(\delta_{MAX} + \pi/2)$, whereby a right-handed or clockwise elliptically polarized light as shown in FIG. 7 is obtained which has a principal polarization axis on the X axis or the Y axis.

Alternatively, it is possible to obtain a left-handed or counterclockwise elliptically polarized light having the principal polarization axis on the X axis or Y axis, by giving a phase difference of $(\delta_{MAX} + \pi/2)$ when the output of the light detector 6 is the maximum or $(\delta_{MAX} - \pi/2)$ when the output is the minimum.

To the incident light 11 as modified as shown FIG. 7 is then given a phase difference of +45 degrees or −45 degrees by the second phase compensator 2, so that the output of the light detector 6 becomes maximum to modify the incident light 11 to give a linearly polarized light lying on the X axis.

Alternatively, the phase compensator 2 may be so controlled that the light quantity received by the detector 6 becomes the minimum to convert the incident light 11 into a linearly polarized light lying on the Y axis.

Further, by decreasing the phase compensation by the phase compensator 2 arranged at −45 degrees, from the condition of the linearly polarized light lying on the X axis, the polarized condition varies from the linearly polarized condition to a right-handed elliptically polarized condition, thereby finally giving an right-handed circularly polarized condition.

On the other hand, by increasing the phase compensator, the light varies from the linearly polarized condition to a left-handed elliptically polarized condition and then to a left-handed circularly polarized condition.

Also, by rotating by the rotor 3 the the polarized light controlled by the second phase compensator 2 to have a principal polarization axis in the direction of the X axis or the Y axis, it is possible to continuously obtain polarized lights having a difference in the principal polarization axis angle.

Further, the phase compensators 1 and 2 may utilize an element having an optoelasticity of an optical fiber and the polarization rotor 3 may utilize an element having a Faraday effect of an optical fiber. As the beam splitter 4, a fiber coupler may be utilized and as the analyzer 5, a fiber polarizer may be utilized to perform similar operations.

According to the present invention it is possible to convert any polarized light into a linearly, elliptically or circularly polarized light having a specific principal polarization axis angle by using phase compensation means, and to adjust the angle of the principal polarization at will by a polarization rotor, so that any polarized light having a known state of polarization can be obtained.

Figure 11:
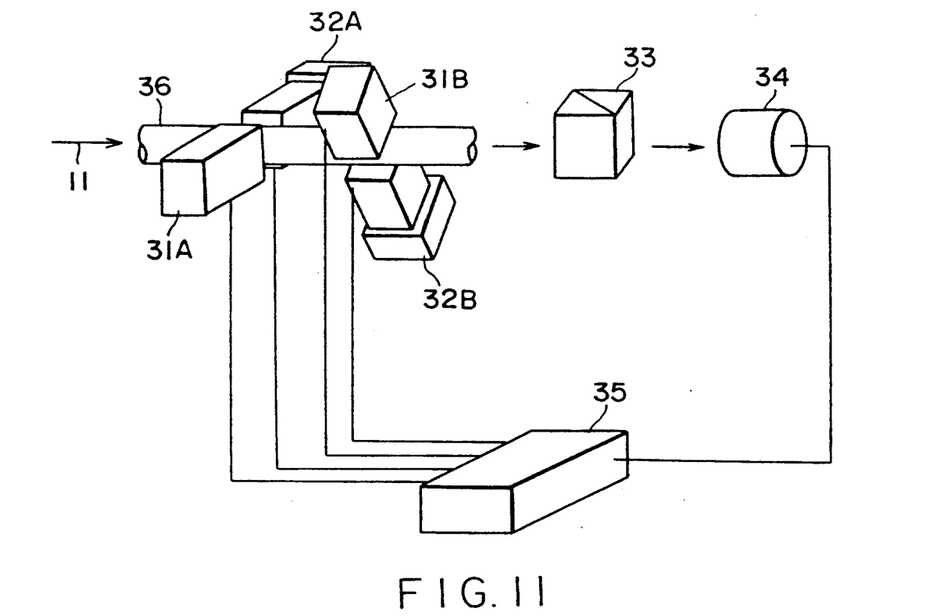
FIG. 11 illustrates a polarization measurement system according the present invention.

Referring to FIG. 11 which illustrates a polarization measurement system using the principle of the present invention, the system comprises a first external force applicator 31A for applying a first external force on an optical fiber 36 in a radial direction, a first force measuring device 32A for measuring the external force applied by the first force applicator 31A to the optical fiber 36, a second external force applicator 31B for applying a second external force on the optical fiber 36 in a radial direction deviated by 45 degrees from the radial direction of the first force, a second force measuring device 32B for measuring the external force applied by the second force applicator 31B to the optical fiber 36. The system further includes an optical analyzer 33 positioned at a location downstream of the location where the first and second external forces are applied to the optical fiber 36 through which an incident light 11 passes. The analyzer 33 is so oriented at an angle that the transmission axis direction of the analyzer 33 does not coincide with any of the directions of the first external force, the second external force and directions normal to these directions of the forces. The analyzer 33 is adapted to convert into a quantity of light the condition of the phase difference of the incident light 11 controlled by the first and the second external applicators 31A, 31B, a light detector 34 for detecting the light output exiting from the analyzer 33, and a controller 35 for controlling the first and the second external force applicators 31A, 31B to adjust the output of the light detector 34 to the maximum or minimum.

In FIG. 11, the analyzer 33 is fixed and the external force applicator 31B on the incident light side of the analyzer is positioned to clamp the optical fiber 36 and the external force applicator 31A on the further incident light side is positioned to clamp the optical fiber 36.

Accordingly, the incident light 11 enters the optical fiber 36, travels past the applicators 31A, 31B, then through the analyzer 33 and into the light detector 4.

Also, on the bottom portion of the external force applicators 31A, 31B, force measurement devices 32A and 32B such as load cells or the like are mounted.

the unknown incident light entering the optical fiber 36 is modified by the external force applicators 31A, 31B, the analyzer 33, the light detector 34 and the controller 35 into a known polarized light. Therefore, it is possible to derive the phase difference from the external forces applied by the external force applicators 31A, 31B, as measured by the external force measurement devices 32A, 32B.

Incidentally, the load cells 32s are described in Osamu Taniguchi et al "Keisoku Kogaku" page 136 of "Saishin Kikai Kogaku Series Vol. 16, published by Kitamori Shuppan KK, 1977.

The principle of the measurement will be explained.

The external force applicators 31A, 31B introduces a phase difference between the component of the electric field along the external force applied and the component of the electric field normal to external force, making use of the optoelasticity effect experienced upon application of force in the radial direction of the fiber. There is a relation (2) between the force F and the phase difference $\phi$.

$$\phi = 8CF/\lambda b \tag{2}$$

where C is a optoelastic coefficient, $\lambda$ is a wave length of the incident light, and b is a radius of the optical fiber 36.

Incidentally, the equation (2) is described by Yasuo Mizushima et al "Optoelasticity of Single Mode Optical Fiber" page 43 of "OQE 84-14", by Denshi Tsushin Gakkai, 1984.

The external force applied to the optical fiber 36 as well as the phase difference are controlled by using piezoelectric elements as the external force applicators 31A, 31B.

Figure 13:
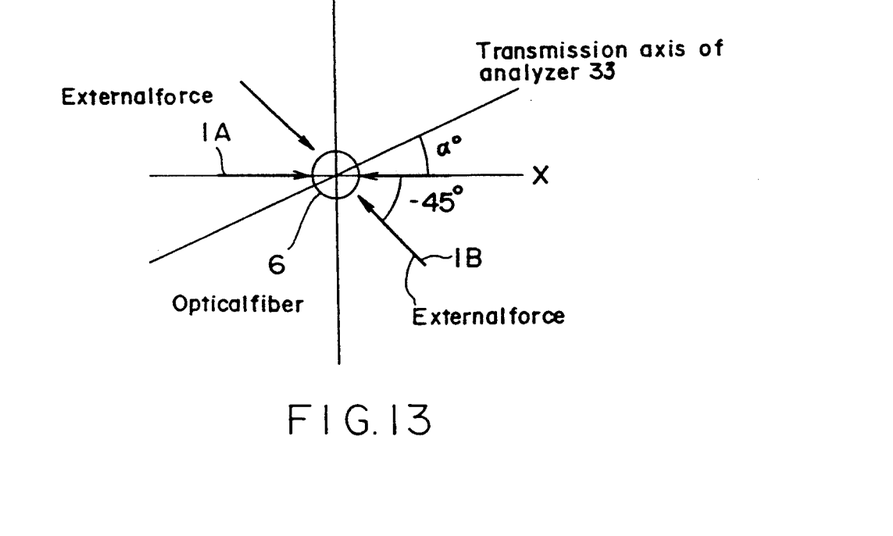
FIG. 13 shows an arrangement of the external force applicators.

FIG. 13 explains the mutual relation of the external force applicators 31A, 31B.

FIG. 13 shows the case where the direction of the external force applied by the external force applicator 31A is set in the X axis direction, the direction of the external force applied by the external force applicator 31B is set in the direction deviated by $-45$ degrees from the X axis, and the transmission axis direction of the optical analyzer 33 is set at $\alpha$ degrees as measured from the X axis direction.

Of course, the direction of the external force applied by the external force applicator 31B may be set in the direction deviated by $+45$ degrees from the X axis.

Also, the transmission axis direction $\alpha$ of the optical analyzer 33 may have any angle unless it does not coincide with any of the directions of the external forces and those normal thereto. The reason will be explained in connection with FIG. 14.

Figure 14:
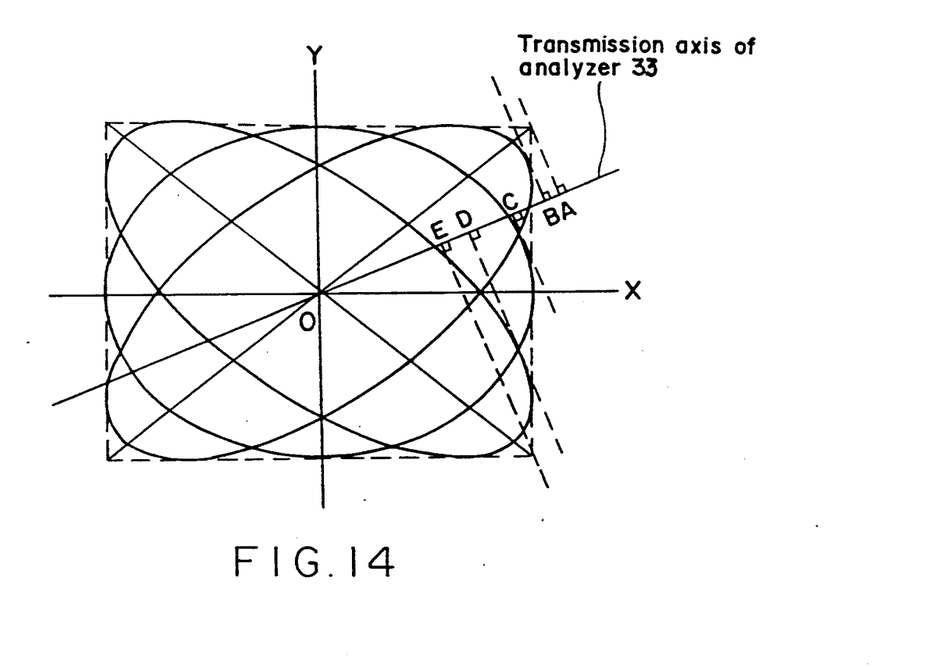
FIG. 14 is an explanatory view for showing the change in the polarized conditions with varying external forces applied in the X axis direction by the external force applicators.

FIG. 14 shows a process as to how the polarized condition will very depending on the applied external force in the direction of the X axis.

In this case, the quantity of the light passing through the analyzer 33 is proportinal to the square of the light quantity of the light component in the transmission direction. For example, for the polarized condition a, the quantity of the light passing through the analyzer 33 is proportional to the square of OA and for the condition b, the quantity of the light passing through the analyzer 33 is proportional to the square of OB.

Accordingly, if the transmission axis of the analyzer 33 is in conformity with the X axis, that is, the direction of the external force applied by the external force applicator 31A, the output remains the same and there will be no change. This holds good for the external force applicator 31 B.

For this reason, it is necessary that the direction of the transmission axis does not coincide with the directions of the external forces applied by the external force applicators 31A and 31B.

Next, the operation will be explained in detail on the premise that the transmission axis of the analyzer 33 is fixed at an angle of 25 degrees with respect to the X axis, by making reference to FIGS. 6-10 and 15-16. FIGS. 6-10 are for the first embodiment described in the foregoing but are applicable to this embodiment except that the transmission axis of the analyzer 3 is replaced by that of the analyzer 33. Accordingly, the following explanation will be made in reference to these figures with the analyzer replaced.

FIG. 6 shows an incident light 11 which is any elliptically polarized light.

FIG. 7 shows a case where the incident light 11 has been so adjusted that the principal polarization axis comes to lie on the X axis or Y axis by changing the phase difference of the incident light 11 by the external force applicator 31A.

FIG. 8 shows a variation of the light (here, the monitor light 13 is replaced with the light passed through the analyzer 33) which is obtained during adjustment process by the external force applicator 31B.

In order to superpose the principal polarization axis of the incident light 11 on the X axis or the Y axis, the phase difference given by the external force applicator 31B is made zero, and the quantity of the light received by the light detector 34 after passing through the analyzer 33 is used in the controller 35 to control the external force applicator 31A to give a phase difference $\delta_{MAX}$ which makes the light quantity maximum or to give a phase difference $\delta_{MIN}$ which makes the light quantity minimum.

At this moment, the polarized condition of the incident light is converted into a linearly polarized light as shown in FIG. 9 when the light quantity received by the light detector 34 is the maximum, or a linearly polarized light as shown in FIG. 10 when the light quantity received by the light detector 34 is the minimum.

Next, when the quantity of the light received by the light detector 35 is the maximum, in other words, the polarization is linear as shown in FIG. 9, the phase difference given by the external force applicator 31A is made to be $(\delta_{MAX} - \pi/2)$.

On the other hand, when the quantity of the light received by the light detector 35 is the minimum, the phase difference given by the external force applicator 31A is made to be $(\delta_{MAX} + \pi/2)$, whereby an righthanded or clockwise elliptically polarized light as shown in FIG. 7 is obtained which has a principal polarization axis on the X axis or the Y axis.

Figure 15:
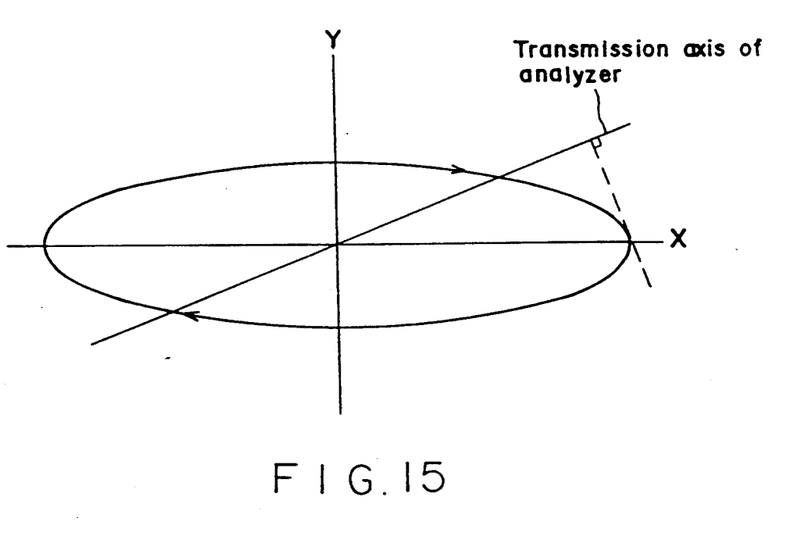
FIGS. 15 and 16 are (together with FIGS. 6-10) explanatory views for explaining the operation with the transmission axis of the analyzer 33 is fixed.
Figure 16:
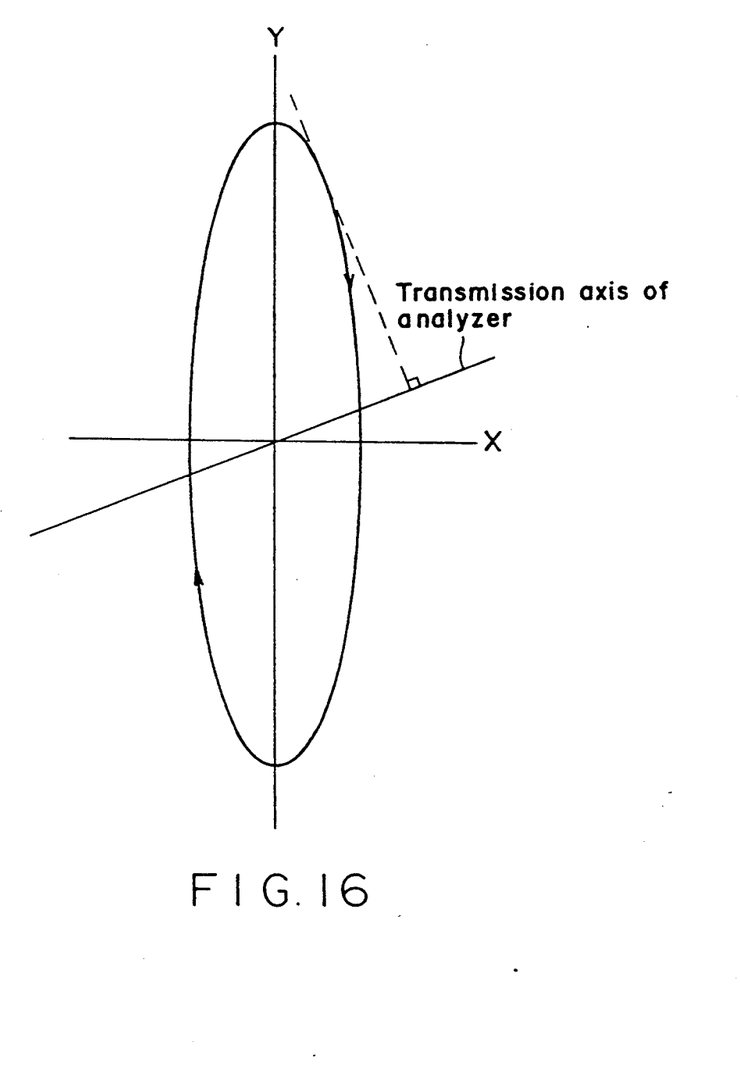

FIG. 15 shows an intermediate state of polarization of an incident light where a phase difference was applied to the X axis in the angular direction of $+45$ or $-45$ degrees using the external force applicator 31B but its control has not been completed yet. For example, assuming that the direction of the external force is −45 degrees and the phase difference is gradually increased by the external force applicator 31B, the quantity of light is gradually increased and reaches the maximum when the polarized condition is a linearly polarized light in the X axis direction.

Alternatively, if the directional angle of the external force applied by the applicator 31B is set at −45 degrees and the phase difference is decreased. The polarization varies via the condition indicated in FIG. 16 and finally into a linearly polarized light lying on the Y axis.

In this manner, any incident polarized light can be converted into a linearly polarized light on the X axis or Y axis.

In this case, assuming that the direction of the external force applied by the applicator 31B is in the direction deviated by +45 degrees and the control of the exit polarized light is a linearly polarized light on the Y axis, the phase difference $\delta_o$ between the electric field components on the X and Y axes given by the two external force applicators 31A and 31B are expressed by the following equation (3).

$$\delta_o = \pi/2 - \delta_1 \quad (3)$$

Using the phase difference $\delta_o$ of (3) and the $\delta_2$ of (2) using the force measurement device 32B, the degree of polarization $P_o$ and the principal polarization axis angle $\theta$ are calculated from the following equations (4) and (5).

$$P = \sqrt{\cos^2\delta_2 + \sin^2\delta_2 \cos^2\delta_o} \quad (4)$$

$$\theta_o' = \tan^{-1}[\tan\{2 \tan^{-1}(\cot(\delta_2/2))\} \times \cos \delta_o]/2 \quad (5a)$$

For $90° \geq \delta_2 < 270° \theta_o = \theta_o'$ \quad (5b)

For $-90° \geq \delta_2 < 90° \theta_o = \pi/2 + \theta_o'$ \quad (5c)

The direction of the rotation can be derived from the phase difference $\delta_o$ and the range of the principal polarization axis direction angle $\theta_o$ derived in (3) and (5).

For $0° < \delta_o < 180°$ and $0° \leq \theta_o \leq 90°$, $-180° < \delta_o < 0°$ and $-90° \leq \theta_o \leq 0°$ the rotation is left-handed and For $0° < \delta_o < 180°$ and $-90° \leq \theta_o \leq 0°$, $-180° < \delta_o < 0°$ and $0° \geq \delta_o \geq 90°$ the rotation is right-handed.

According to this embodiment, a pair of external force applicators are used to exert forces to two radial directions of an optical fiber which receives an incident light and, in response to the quantity and the direction of change of the light received after the incident light has passed through an optical analyzer, the electric voltage to be applied to the external force applicators are regulated and the forces applied to the fiber is measured by force measurement devices. Thus, from the phase difference derived using the measured values, the degree of polarization, the principal polarization axis angle, and the direction of rotation of the polarized light.

Further, although the analyzer is fixed there is no need precise fixing of the analyzer and accordingly the effect of the measurement accuracy is alleviated.

The system is small in size because of the electric control using the external force applicators.

We claim:

1. A polarization control system which comprises:
   a first phase compensator for introducing a phase difference with respect to an incident light;
   a second phase compensator for introducing a phase difference by 45 degrees with respect to the light passed through the first phase compensator;
   a polarized light rotor for rotating the plane of polarization of the light passed through the second phase compensator;
   a beam splitter for dividing the light passed through the rotor into an exit light and a monitor light;
   an analyzer so arranged that the direction of the transmission axis of the analyzer does not coincide with the principal axes of the two phase compensators for converting the polarized condition of the light formed by the first phase compensator, second phase compensator and the polarization light rotor into a light volume;
   a detector for detecting the light passed through the analyzer; and
   a controller for controlling the first and second phase compensators and the polarized light rotor in response to the output of the light detector.

2. A polarization measurement system which comprises:
   a first external force applicator for applying a first external force on an optical fiber in a radial direction;
   a first force measuring device for measuring the external force applied by the first force applicator to the optical fiber;
   a second external force applicator for applying a second external force on the optical fiber in a radial direction deviated by 45 degrees from the radial direction of the first force;
   a second force measuring device for measuring the external force applied by the second force applicator to the optical fiber;
   an analyzer positioned at a location downstream of the location where the first and second external forces are applied to the optical fiber through which an incident light passes, said analyzer being so oriented at an angle that the transmission axis direction of the analyzer does not coincide with any of the directions of the first external force, the second external force and the directions normal to these directions of the forces, and said analyzer converting condition of the phase difference of the incident light so controlled by the first and the second external applicators into a quantity of light;
   a light detector for detecting the light output exiting from the analyzer; and a controller for controlling the first and the second external force applicators to adjust the output of the light detector to the maximum or minimum.

* * * * *